United States Patent [19]

Izuwa et al.

[11] Patent Number: 4,697,060

[45] Date of Patent: Sep. 29, 1987

[54] ELECTRONIC BEAM WELDING METHOD FOR SCREEN CYLINDER

[75] Inventors: Akio Izuwa; Tadanobu Yamaguchi, both of Hiroshima, Japan

[73] Assignee: Mitsubishi Jukogyo Kabushiki Kaisha, Japan

[21] Appl. No.: 878,804

[22] Filed: Jun. 26, 1986

[30] Foreign Application Priority Data

Jun. 26, 1985 [JP] Japan ................. 60-139380

[51] Int. Cl.⁴ ............................................. B23K 15/00
[52] U.S. Cl. ....................... 219/121 ED; 219/121 LD
[58] Field of Search ............... 219/121 EC, 121 ED, 219/121 PJ, 121 PK, 121 LC, 121 LD

[56] References Cited

U.S. PATENT DOCUMENTS 4,288,677  9/1981  Sakata et al. ............. 219/121 ED 4,461,945  7/1984  O'Cheskey et al. ......... 219/121 LC

FOREIGN PATENT DOCUMENTS 2726812 12/1977  Fed. Rep. of Germany ...... 219/121 ED

*Primary Examiner*—C. L. Albritton
*Attorney, Agent, or Firm*—Toren, McGeady & Associates

[57] ABSTRACT

An electronic beam welding method for a screen cylinder for welding junctions between both ends of rod-like pieces arranged at regular intervals and flanges with an electronic beam is disclosed in which the welding is effected so that the irradiation direction of the beam is directed in the same surface as said junction surface and inclined with respect to a welding direction and the beam penetrates the flanges.

2 Claims, 14 Drawing Figures

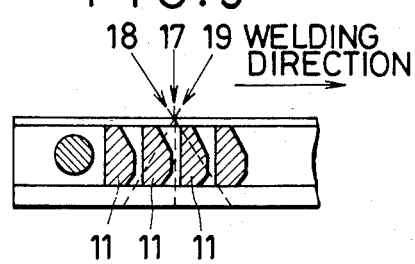
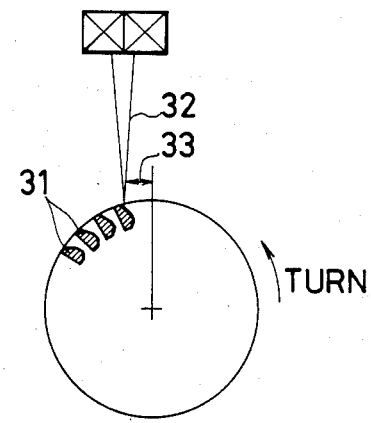
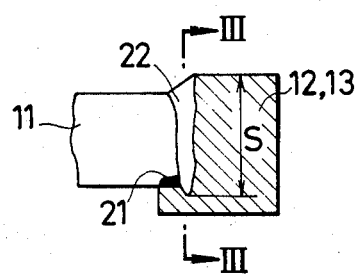
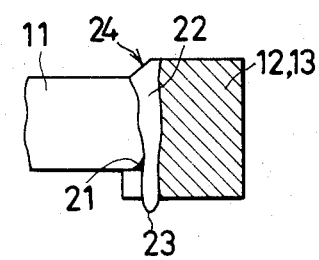
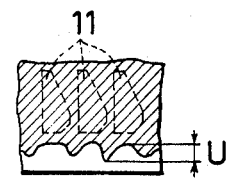
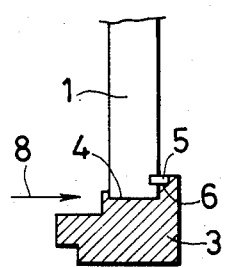
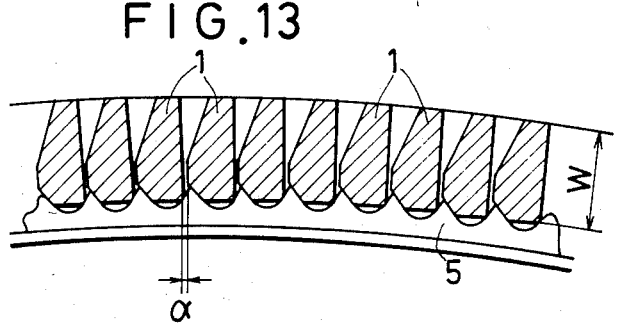

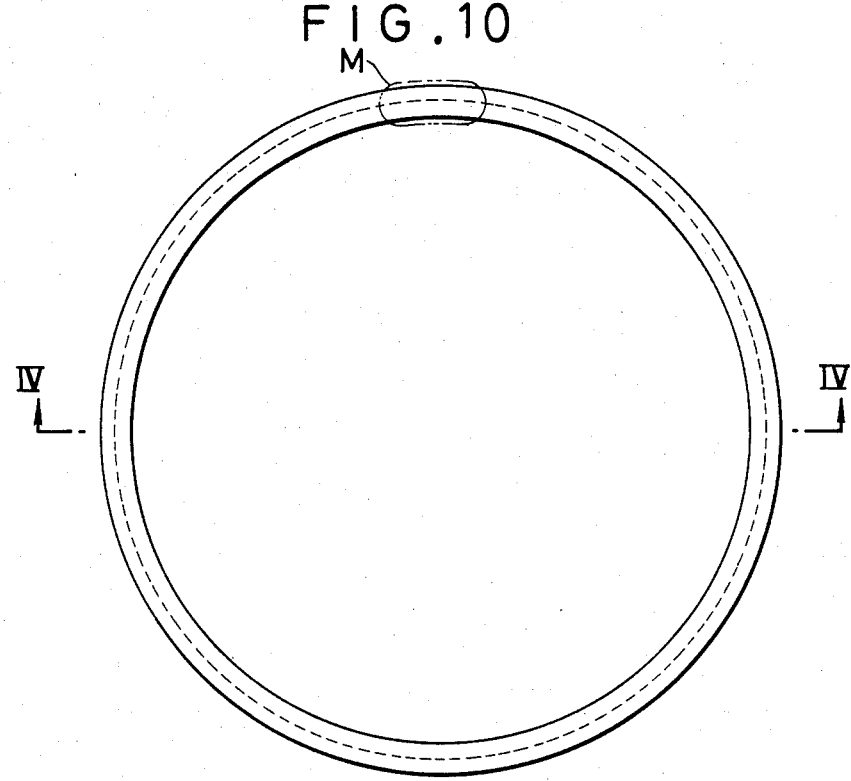
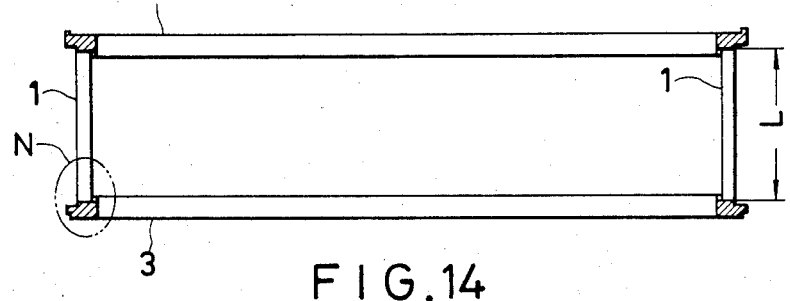
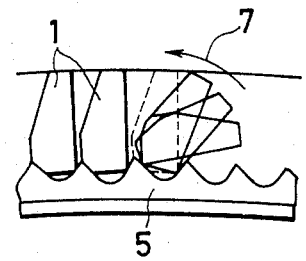

ELECTRONIC BEAM WELDING METHOD FOR SCREEN CYLINDER

FIELD OF THE INVENTION AND DESCRIPTION OF RELATED ART

The present invention relates to an electronic beam welding method for a screen cylinder.

As well known, a paper-making machine is provided with a screen cylinder which removes alien substances in the pulp for the purpose of fine selection. As a related art, one of a recently developed manufacturing method of the screen cylinder is now described with reference to FIGS. 10 to 14, in which FIG. 10 schematically illustrates a plan view of the screen cylinder, FIG. 11 is a sectional view taken along line IV—IV of FIG. 10, FIG. 12 is an enlarged view of an N portion of FIG. 11, FIG. 13 is an enlarged sectional view of an M portion of FIG. 10 taken in the horizontal direction, and FIG. 14 illustrates assembling condition of rods having a special form.

In the figures, reference numeral 1 denotes the rod having a special form, which is supported by an upper flange 2 and a lower flange 3, both diameters of the flanges 2 and 3 being equal to each other. The rod 1 is formed of rolled material having a section shown in FIG. 13 and is obtained by cutting the rolled material reformed to have high straightness to a predetermined length L shown in FIG. 11. The upper and lower flanges 2 and 3 are provided with a groove 4 having a width W of the rod 1 as shown in FIG. 13 and a guide groove 6 for fixing a guide ring 5. The guide ring 5 is used to assemble the rods 1 into a cylindrical form with a predetermined slit width α between the adjacent rods, so that the rods 1 are positioned precisely and efficiently. In this connection, the surface of the flange is previously worked in the predetermined dimension for the convenience of assembling the screen cylinder. As shown in FIG. 14, in the case where the rod 1 is formed to have the section illustrated in this example, when the guide ring 5 is formed to be in the sawtooth wave form as shown, it is convenient to assemble the rods 1 while rotating the rods 1 in the direction of arrow 7 so that the rods 1 are fixed in a predetermined position.

The assembling procedure is now described.

(1) The guide rings 5 are fitted into the guide grooves 6 of the upper and lower flanges 2 and 3, respectively.

(2) A proper jig is used to dispose the upper and lower flanges 2 and 3 in opposed relationship with each other so that the distance between the bottoms of the respective grooves 4 of the upper and lower flanges 2 and 3 opposed to each other is substantially equal to the distance L of the rod 1.

(3) The rods 1 are successively inserted into the respective grooves 4 of the upper and lower flanges 2 and 3 and are rotated in the direction of arrow 7 shown in FIG. 14 so that the rods 1 are fixed in the predetermined position.

(4) When all the rods 1 are completely inserted into the grooves 4 and placed in position, all the rods 1 are cramped by a jig so that the rods 1 are not moved or shifted. When the assembly of the rods is finished, the junctions between the rods 1 and the upper and lower flanges 2 and 3 are fixed. The arrow 8 of FIG. 12 shows a welding direction of the junction. it is desirable to select a welding method which does not require the edge preparation of the welded portion and has less welding distortion and smooth bead surface. Actually, as such a welding method, an electronic beam or laser beam welding method is effective. When the electronic beam welding method is used to weld the junction between the rod 1 and the upper and lower flanges 2 and 3, the welding is unparalleled in the prior art welding method used in the manufacturing of the above screen cylinder.

However, according to the above technique, when a small screen model assembled by using the rods 1 rolled in the sectional form illustrated in FIG. 14 is welded by using the electronic beam welding method, the bead surface is coarse and therefore the bead surface is easily tangled with fibers in the paper material in practical use, thereby deteriorating the value as goods seemingly. It is accordingly necessary to ameliorate this problem for practical use.

OBJECT AND SUMMARY OF THE INVENTION

Accordingly, in view of the foregoing, it is an object of the present invention to provide an electronic beam welding method for a screen cylinder in which the welding of the junction betwen rod-like pieces and flanges of a screen cylinder is effected with less welding distortion and the junction is completely welded so that the bead surface is smooth and stabilized, and undercut and spatter deteriorating the external appearance of the screen cylinder do not occur.

In the present invention, the electronic beam welding method for the screen cylinder for welding the junctions between both ends of the rod-like pieces juxtaposed at regular intervals and the flanges is characterized in that an irradiation direction of the beam is in the same surface as the junction surface and inclined at an acute angle with regard to the welding direction and the welding is effected so that the beam completely penetrates the flanges. The welding of the junction between the rod-like components (rods having the special form) and the flanges has the following effects: (1) the welding distortion is less, (2) the junction is completely welded, (3) the bead surface is smooth and stabilized, (4) undercut is not produced, and (5) spatter deteriorating the external appearance does not occur.

As described above, according to the present invention, when the junctions between the rod-like piece and the flanges are welded by using the electronic beam welding method, the irradiation direction of the beam is not parallel with slits and is inclined properly and the beam is adapted to penetrate the flanges, thereby obtaining the bead having stable welding depth.

BRIEF DESCRIPTION OF THE DRAWINGS

FIG. 5 illustrates irradiation directions of the electronic beam to a rod having a spacial form;

FIG. 6 is a sectional view illustrating a shallow welding depth of the bead weld;

FIG. 7 is a sectional view illustrating a deep welding depth of the bead weld;

FIG. 8 is a sectional view taken along line III—III of FIG. 6;

FIG. 9 schematically illustrates a method of welding a screen cylinder by the electronic beam;

FIG. 10 is a plan view of the screen cylinder;

FIG. 11 is a sectional view taken along line IV—IV of FIG. 10;

FIG. 12 is an enlarged view of an N portion of FIG. 11;

FIG. 13 is an enlarged view of a horizontally cut M portion of FIG. 10; and

FIG. 14 illustrates a manner of assembling the rod.

DESCRIPTION OF A PREFERRED EMBODIMENT OF THE INVENTION

Embodiments of the present invention are now described with reference to the drawings.

Embodiment 1

Figure 1:
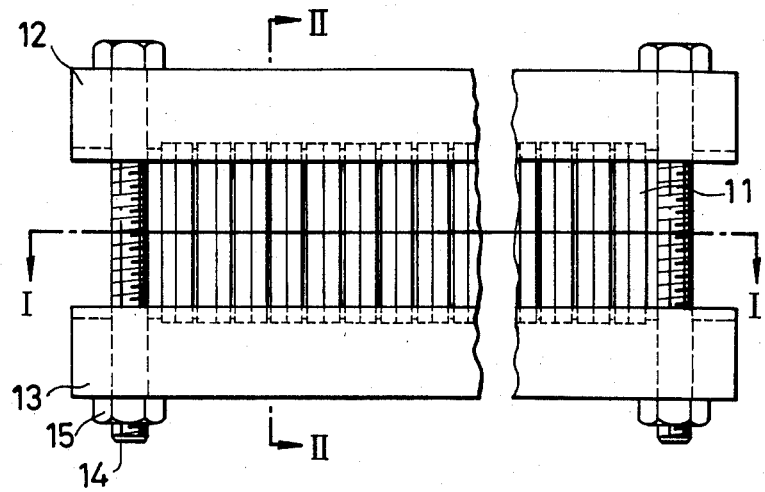
FIG. 1 schematically illustrates a small sample of screen cylinder assembled as a flat model.
Figure 2:
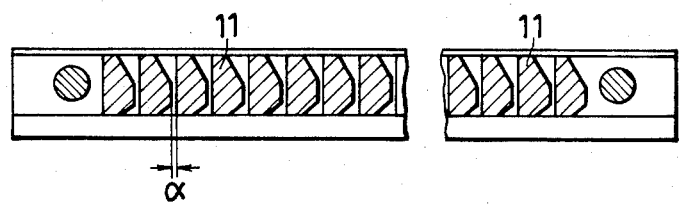
FIG. 2 is a sectional view taken along line I—I of FIG. 1.
Figure 3:
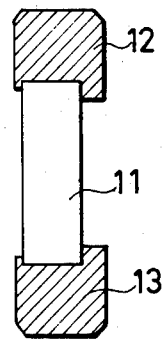
FIG. 3 is a sectional view taken along line II—II of FIG. 1.

Reference is now made to FIGS. 1 to 8, in which FIG. 1 schematically illustrates a small sample of a screen cylinder assembled as a flat type model, FIG. 2 is a sectional view taken along line I—I of FIG. 1, and FIG. 3 is a sectional view taken along line II—II of FIG. 1.

Figure 4:
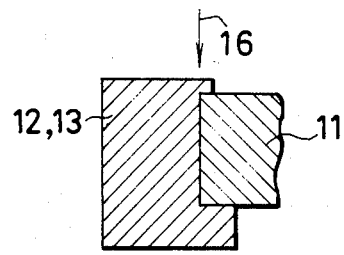
FIG. 4 illustrates an irradiation method of an electronic beam.

In FIG. 1, reference numeral 11 denotes a plurality of rods having a special form. Both ends of each of the rods are fitted into grooves of flanges 12 and 13, respectively. The rods 11 and the flanges 12 and 13 are fixed by bolts 14 and nuts 15. In this example, a shim plate is used to establish a slit width $\alpha$ so that the slit width $\alpha$ is equal to 0.4 mm. FIG. 4 shows an irradiation postion of an electronic beam 16 and the irradiation position corresponds to the junctions between ends of the rod 11 and the flanges 12 and 13. FIG. 5 shows three irradiation directions of the electronic beam to the rod 11. In FIG. 5, arrow 17 illustrates the beam vertically irradiating in the parallel direction with the slit, and arrows 18 and 19 illustrate the beam irradiating in the welding direction or in the opposite direction to the welding direction, that is, irradiating in inclined direction to the welding direction so that the irradiation direction is not parallel with the direction of the slit surface.

(1) Bead Welding without Penetration

As shown in FIG. 6, the welding depth S is set to stop within the flange 12 or 13 without penetrating the flange 12 or 13. When irradiated with the electronic beam in the direction shown by arrow 17 of FIG. 5, the welding in the portions where the slits exist is attained deeply while the welding in the portions where the rods 11 exist is attained shallowly as shown in FIG. 8, so that the welding is varied considerably. FIG. 8 is a sectional view taken along line III—III of FIG. 6. In the figures, numeral 21 denotes a flow of bead 22 and U indicates a variation width of the welding depth. Accordingly, if the whole welding is shallow, the rod 11 is not completely joined and unjoined portions partially occur. Further, if the whole welding is deep so that the rod 11 is perfectly joined, the beam penetrates the flange in the portions where the slits exist, and consequently the external appearance of the bead surface is deteriorated.

To the contrary, when irradiated with the beam in the direction of arrow 18 an acute irradiation angle of 16°, the variation width U of the welding depth is extremely small to the extent of 1.5-2.0 mm. Further, when irradiated in the direction of arrow 19 (in the example proposed by this embodiment), the variation width is further small to the extent of 1 mm.

(2) Bead Welding with Penetration

If the welding depth is set to penetrate the flange 12 or 13 as shown in FIG. 7, a difference in the shape of the rear side wave bead 23 occurs due to the irradiation direction of the beam. More particularly, when irradiated in the direction of arrow 18 of FIG. 5, the rear side wave bead 23 is formed to the humping condition (that is, the bead condition that hump-like beads are successively coupled to each other) and uneven bead deteriorates the external appearance. On the other hand, when irradiated in the direction of arrow 19 of FIG. 5, the rear side wave bead 23 is formed uniformly and the external appearance becomes better. In the case of the penetrating bead welding, the external appearance of the surface bead 24 (refer to FIG. 7) becomes better as compared with that of the bead welding without penetration, and the formation of the bead in the portions where the slit width is formed is minimized. The formation is desirably minimized as small as possible since the formation is easily tangled with fibers in the paper material.

In the present invention, the welding is effected so that the electronic beam 16 is inclined as shown by arrow 19 (at the inclined angle 16°) with respect to the welding direction within the junction surface and the beam penetrates the flange 12 or 13. Thus, the welding is deep in the portions where the slits exist and perfect welding is attained. Accordingly, the variation width is extremely minimized and excellent external appearance is obtained.

Embodiment 2

Referring to FIG. 9, there is illustrated a method of welding a screen cylinder with the electronic beam. In FIG. 9, numeral 31 denotes rods having a special form and arranged in a cyrindical form, the rods being shown in section. Numeral 32 denotes the electronic beam which irradiates down in the vertical direction. In order to establish the irradiation angle of the beam with respect to the rods 31, the center of the cylinder is shifted eccentrically from the beam center and the screen cylinder is turned, so that the cylinder is irradiated with the electronic beam at any angle. In the figure, numeral 33 indicates an eccentric distance.

In the present invention, when a beam deflecting apparatus is not provided or when the beam can not be deflected at a large angle even if the beam deflecting apparatus is provided, the beam irradiating angle can be controlled as described above. Actually, when the bead welding with penetration was effected with the diameter of the cylinder being 500 mm and the eccentric distance being 40 mm, the front surface bead and the rear side wave bead were obtained stably as compared with the small sample and the surface condition was actually sufficient even if the surface is not finished by a grinder or the like.

Further, it is extremely preferrable to improve the surface bead more smoothly by irradiating with the beam on the initial bead as an ornamental welding once more while reducing the output of the beam and shifting the focus of the beam from the surface to spread the beam irradiation range.

As described above, according to the present invention, the welding of the junction between the rod-like piece and the flange has less welding distortion and the junction is completely welded so that the bead surface is smooth and stablilized, and the undercut and the spatter deteriorating the external appearance are not produced. There can be provided the electronic beam welding method for the screen cylinder applicable to products such as Mitsubishi K type screen, a centrifugal screen, a centrifugal sorter, a barrier type screen and the like.

What is claimed is:

1. An electronic beam welding method for a screen cylinder for welding junctions between both ends of rod-like pieces arranged at regular intervals and flanges with an electronic beam, characterized in that the welding is effected so that the irradiation direction of the beam is directed in the same direction as the surfaces of the welding junction and inclined at an acute angle with respect to a welding direction and the beam completely penetrates the flanges.

2. An electronic beam welding method for a screen cylinder according to claim 1, characterized in that the electronic beam is inclined in a welding moving direction and the irradiation with the beam is effected from a direction opposed to the moving direction.

* * * * *